Aug. 21, 1956     W. SCHLEGEL     2,759,257
PROCESS FOR FORGING CAST IRON AND THE LIKE
Filed Nov. 20, 1952     2 Sheets-Sheet 1

Inventor:

United States Patent Office 2,759,257
Patented Aug. 21, 1956

2,759,257

PROCESS FOR FORGING CAST IRON AND THE LIKE

Werner Schlegel, Velbert (Rhineland), Germany

Application November 20, 1952, Serial No. 321,544

Claims priority, application Germany November 24, 1951

4 Claims. (Cl. 29—528)

This invention relates to a process of and apparatus for producing press-forgings by hot-working.

The invention is an improvement over that of German patent specification No. 842,296. That patent describes a process for the production of press-forgings from malleable materials by hot-working, wherein the material, after partial solidification in a pre-mould, is introduced into a press-mould in a carefully determined quantity according to the ultimate volume required and, in an essentially doughy condition, is finally moulded by a single press-process. The process of the German patent is specifically characterized in that the resultant fin or flash is guided into a direction opposite to the pressure, or in other words forced upwards to become cup-shaped and that the cup-shaped flash is trimmed off in a subsequent operation.

Hammer-forged or press-forged articles from malleable substances have also been produced heretofore by heating a so-called half-finished product to forging-temperature and then pressing or hammering it in a suitable apparatus. The half-finished article thus employed is usually produced in bars or slabs by casting in a mould followed by a further shaping process such as rolling or drawing. From these bars or slabs, sections of suitable length are cut off and heated to forging-heat. The final moulding then takes place in the die under a hammer or press, but several hammer or press strokes are usually necessary before the article acquires the ultimate shape. In the case of larger or more complex forgings several strokes are also required for moulding since the fin formed between the upper and lower dies cools rapidly, thus offering considerable resistance by its great tenacity in the further moulding of the core-piece. The forging process has therefore to be interrupted, firstly to remove the fin in a special process employing a trimming device for this purpose, then to re-heat the half-finished article, after which the press-operation is continued in the same or in a different die until the ultimate result is obtained. As this known press and forging process is uneconomical in every way due to the multiplicity of operations, attempts have also been made to replace smaller press-forgings by cast-iron or to replace articles of greater size by cast-steel. Regarding mechanical strength and resistance to fracture, however, articles of cast-iron or of cast-steel cannot completely replace press-forgings because with castings there always exists the danger of funnel-formation or of segregation.

According to German patent specification No. 842,296 the intermediate steps leading from melted scrap to the half-finished article and likewise the repeated heating and forging and the intermediate removals of fins are obviated, so that a high quality finished product of high mechanical strength is obtained substantially directly from the melted scrap. For this purpose the German patent specification No. 842,296 describes a device the lower die-section of which carries a superimposed piece limiting lateral flow of the material under treatment and enclosing the press-die in such a manner that a cup-shaped gap remains. Moreover, a familiar type of trimmer is provided on the lower die for the cup-shaped fin. For shearing off the cup-shaped ridge occurring during the process, a device is employed in which the punch moves within a sprung positioning device which determines accurately the position of the article relative to the cutting-plate.

The present improvement over German patent specification No. 842,296 is based on the discovery that pre-cast blanks, in particular those of normal substantially non-malleable cast-iron but also those of cast-steel, may be successfully pressed when and only when the forging and pressing not only follows the basic idea underlying the German patent specification aforesaid but takes place in a die adapted substantially to prevent, not only to limit and deflect, any lateral flow of the fin. The forging of pre-cast blanks tends to cause cracks if the fin of surplus material flows radially outwards at any time. By such radial flow of the fin the micro-structure of the pre-cast material is subjected to high and frequently undue stress, so that the fin splits open and the resultant cracks are liable to extend further in an inward direction.

It has also been discovered that ordinary die-plates of closed dies are often insufficient. For present purposes, dies consisting of three parts have been proved more advantageous. Such dies are formed, according to one characteristic of the invention, in such a manner that the upper section of the die is carried within a mid-section which resists the action of the ram by means of strong springs. This mid die-section sits on the lower section during operation thus effecting sealing the die. The upper-die following thereafter then presses the material of the blank into the mould, enclosed on all sides providing however for forward or backward (not cup-shaped) extrusion of the fin. In the case of double-acting presses the upper and mid-dies operate independently whereby the plate springs become redundant.

The new method

The new method starts by pre-casting from suitable metals or alloys a blank having a volume slightly in excess of the volume of the desired finished article. Desirably this blank also has a form approaching that of the desired finished article so as to minimize the extent of metal flow incident to the hammer or press forging operation; this applies particularly when materials of poor malleability such as cast iron are used.

It is impossible to produce, by casting in open chill-moulds, blanks of accurately similar volume; it is therefore necessary to provide cavities in closed dies into which a fin or slight surplus of material can penetrate. The longitudinal fin according to the invention diverts the surplus material to areas in which it is harmless and may be easily removed.

It is a most important feature of the new method, mainly in the case of cast iron and the like, that the excess material is not permitted to flow radially outwards as a fin, in view of the danger of cracks forming. Thus it is necessary either to cause the excess to rise upwards in cup-formation (in cases where it is practical to use the German patent specification aforesaid) or to arrange the excess flow according to the new invention; that is to force this excess flow to proceed directly from the blank in a direction parallel with the press or hammer stroke, either forward or backward, and not radially outwards. It appears that this avoids the rapid thinning out and congealing of the fin which in the case of radial outward flow occurs, the thinning out being proportional to the square of the outward displacement. It should be understood that material portions of the blank, other than a thin flash or fin, may very well be diverted outwards, at least in some of the applications or modifications of the present method, but that no outward flow should be allowed for any thin flash or fin, for the reasons as indicated. Preferably the fin of excess material is caused to proceed forward or backward in the center of the press-forging. At least some of the material of the blank is then compelled to flow towards the center. As a result, a corresponding backward pressure is exercised at the periphery, thus contributing to the strengthening of the structure of the forging.

By such methods it is possible to produce articles of cast iron and other metals, which are particularly suitable for many installation purposes, due to their high corrosion-resistance, strength, resilience, and smooth, flawless contact-surfaces.

The pressure forces in a closed die may be described as downward thrust, radial compression, and upward thrust. These forces produce the required changes of form and also cause kneading and compression of the substance. It is therefore advisable to determine the shape of the blank by forging experimentally in the die, in exactly the same manner as the required size of stock is determined by experiment in the metal-drawing process. Thus the quantity of material in excess of the volume of the finished forging can be calculated accurately in relation to the cavities in the die or vice-versa. The dimensions of the cavities or volume of excess material depends largely on the size and shape of the press-forging.

For pressing, the typical forging temperature suitable to each alloy is chosen. A suitable type of conveyor-belt (not shown) is desirably installed between press and furnace, its movement being controlled by and synchronized with that of the press. The conveyor-belt is provided with a corresponding number of chill-moulds, its length being so calculated that the castings on the way from furnace to press experience the requisite fall from casting-temperature to forging-temperature.

The process makes it possible to forge cast-iron articles even up to a carbon-content of 3.5%, Si-content 2.5% and normal S- and P-content. The tensile strength (yield strength) of the forged cast-iron is very high and reaches values characteristic of good structural steels. It can be demonstrated by ground-section photographs that the reason for the increase in strength lies in the fact that the laminated, irregularly disposed graphite of the raw casting undergoes a far-reaching uniformity of structure by the forging process.

The new apparatus

In the accompanying drawings preferred embodiments are illustrated by way of example.

Figure 1:
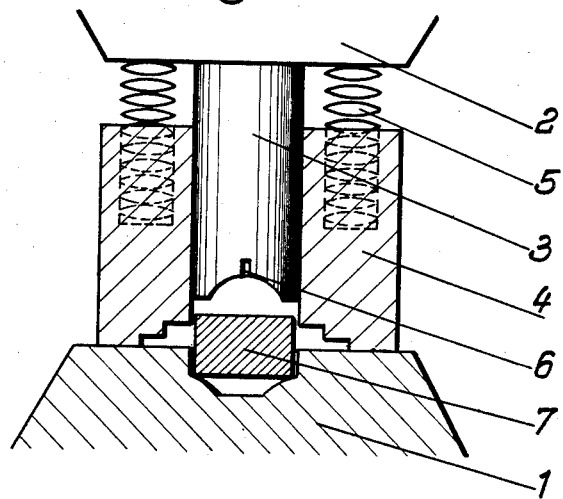
Fig. 1 is a diagrammatic view of structure for a basic method according to the invention.

In Fig. 1 there is to be seen a lower die 1, an upper die 3 connected to the press-ram 2 and an intermediate section or die 4 peripherally surrounding the upper die, said intermediate section being connected to the ram 2 by the insertion of springs 5. At 6 a central fin recess for receiving the surplus material is to be seen, whilst at 7 a blank casting is illustrated, inserted in the die.

It will be noted that the intermediate die section 4 may provide recesses for radial outward flow of material from the blank. If the material of the blank is relatively malleable or ductile these radial outward recesses may extend outwards over appreciable distances as shown; even then they are desirably dimensioned so as to keep the outwardly flowing material from thinning out and cooling and consequently cracking during or between the forming operations. This object of course is further served by the provision of the recess 6 for inward, longitudinal escape of the excess material.

Figure 2:
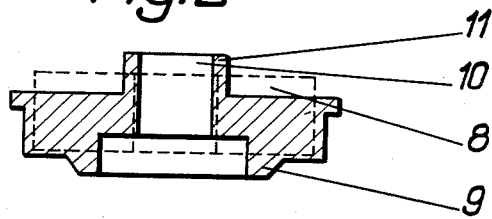
Fig. 2 depicts a completed forging with the appropriate blank for its production.

In Fig. 2 a blank is indicated by dotted lines at 8, whilst the completely forged article 9 is drawn in full lines. It is to be noted that the bore in the blank is slightly wider than the bore 10 of the finished piece, and that slight differences of width exist also at the outer periphery. These differences are sufficient to effect a kneading of the material, which is promoted further by the rising of a small mass of useful or surplus material within the neck 11. The height of the neck may be irregular; and the excess can be subsequently removed by trimming.

Figure 3:
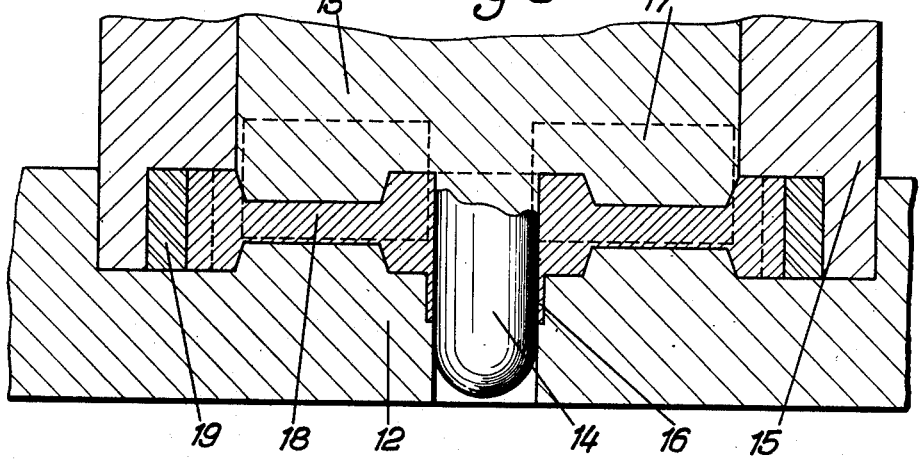
Fig. 3 shows a closed die for accurate reproduction of gears by forging.

In Fig. 3 a completely forged gear is shown at 18, the bore having been formed by the mandril 14 attached to the upper die 13 and the teeth by the intermediate die 15. The lower die 12 has a bore for mandril 14, with an enlarged recess 16 in which the excess material of the raw-casting 17 (with bore indicated by dotted lines) can penetrate.

The economy of this process of production is enhanced by forming the tooth-forming section as a removable ring 19 attached to the intermediate die 15.

Such a removable tooth forming or generally interposed section, or the holder 15 thereof, is desirably sprung against the pressure plate 12 in the manner shown in Figure 1 at 5. The principle is substantially the same as in the so called suspension jacket die for the press forging of sinter metals.

During the press or hammer stroke or strokes the intermediate die section 15 applies pressure initially in the outer part of the blank, causing both outward and inward flow of metal and starting the formation of the gear teeth. When the central die section 17 begins to apply pressure, continued outward flow is already resisted by the intermediate section 15 and its insert 19, to an extent greater than inward flow is resisted by the central mandril 14, so that the final excess is formed as an annular ridge 16. The center bore of the gear is thus formed as smoothly as the peripheral tooth surfaces, with or without grooves or the like in the center bore. Under the conditions described, the teeth not only acquire desirable shape and smoothness but also high mechanical strength and resistance to abrasion, due to the formation of a graphitic structure in this region.

Figure 4:
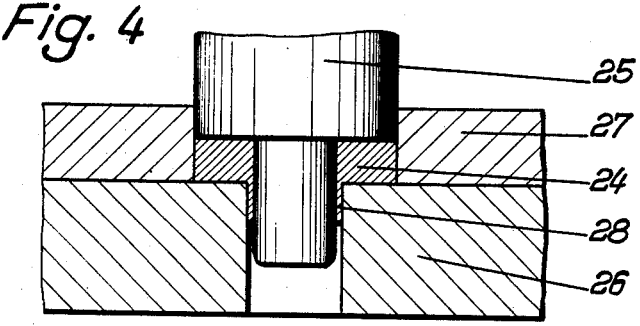
Fig. 4 is a diagrammatic view of a structure for a further method of carrying out the process of the invention.

In Fig. 4 the pre-cast piston-ring 24 is expanded radially by the downward course of the slightly tapered mandril of the ram 25 and is subsequently finished by the pressure of the breast of the ram 25 and the closed neck formed by the lower die 26 together with the interchangeable metal ring 27 packed with metal-foil on the inner-face. The surplus material is forced into a gap provided between the ram 25 and the lower die 26, forming a circular fin 28.

I claim:

1. A process of forging cast iron and the like comprising the steps of casting a blank with slightly greater volume and different configuration as compared with the ultimate product desired; maintaining forging temperature in the casting; forging the casting so as to extrude a thin flash of relatively minor volume directly therefrom in a direction parallel with the forging stroke; and removing at least parts of the flash.

2. A forging process as described in claim 1 wherein the flash is formed at a part of the casting adjacent the center of the casting, in a plane transverse of the stroke.

3. A casting process as described in claim 1 wherein the forging operation is performed in consecutive and inwardly progressive steps.

4. A forging process as described in claim 3 wherein the forging operation is performed so that the formation of the flash occurs about the end thereof.

(References on following page)

References Cited in the file of this patent

UNITED STATES PATENTS

| | | | |
|---|---|---|---|
| 125,376 | Brown | Apr. 9, | 1872 |
| 356,974 | Bagaley | Feb. 1, | 1887 |
| 1,224,805 | Stevenson | May 1, | 1917 |
| 1,234,654 | Gaynor | July 24, | 1917 |
| 1,432,514 | Albrecht | Oct. 17, | 1922 |
| 1,912,965 | Brownstein | June 6, | 1933 |
| 2,356,695 | Priest | Aug. 22, | 1944 |
| 2,411,379 | Langhammer | Nov. 19, | 1946 |
| 2,509,783 | Richardson | May 30, | 1950 |
| 2,540,457 | Rice | Feb. 6, | 1951 |

FOREIGN PATENTS

| | | | |
|---|---|---|---|
| 842,296 | Germany | June 26, | 1952 |